United States Patent
Sang et al.

(10) Patent No.: US 10,400,382 B2
(45) Date of Patent: Sep. 3, 2019

(54) DRAINAGE APPARATUS

(71) Applicant: LG ELECTRONICS INC., Seoul (KR)

(72) Inventors: Minkyu Sang, Seoul (KR); Hosang Jang, Seoul (KR); Jihong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/274,542

(22) Filed: Sep. 23, 2016

(65) Prior Publication Data

US 2017/0089000 A1 Mar. 30, 2017

(30) Foreign Application Priority Data

Sep. 25, 2015 (KR) .................... 10-2015-0136776

(51) Int. Cl.
| | |
|---|---|
| *D06F 39/08* | (2006.01) |
| *F16L 41/02* | (2006.01) |
| *D06F 29/00* | (2006.01) |
| *E03C 1/122* | (2006.01) |
| *D06F 31/00* | (2006.01) |

(52) U.S. Cl.
CPC ............ *D06F 39/083* (2013.01); *D06F 29/00* (2013.01); *E03C 1/122* (2013.01); *F16L 41/023* (2013.01); *D06F 31/00* (2013.01)

(58) Field of Classification Search
None
See application file for complete search history.

(56) References Cited

U.S. PATENT DOCUMENTS

| | | | | |
|---|---|---|---|---|
| 5,248,218 A | * | 9/1993 | Belcher ................. | F16L 45/00 138/37 |
| 5,415,438 A | * | 5/1995 | Kojima ................. | E03C 1/122 285/125.1 |
| 2009/0158784 A1 | * | 6/2009 | Kim ....................... | D06F 31/00 68/27 |

FOREIGN PATENT DOCUMENTS

| | | |
|---|---|---|
| CN | 201553904 U | 8/2010 |
| CN | 102216515 A | 10/2011 |
| CN | 204083608 U | 1/2015 |
| CN | 204420423 U | 6/2015 |
| CN | 104755668 A | 7/2015 |
| JP | 57-42778 U | 3/1982 |
| JP | 60-139290 A | 7/1985 |
| JP | 62-15037 Y2 | 4/1987 |

(Continued)

OTHER PUBLICATIONS

JPS5742778, entire translated document, Mar. 9, 1982 (Year: 1982).*

(Continued)

*Primary Examiner* — Jason Y Ko
*Assistant Examiner* — Cristi J Tate-Sims
(74) *Attorney, Agent, or Firm* — Dentons US LLP

(57) ABSTRACT

There is disclosed a drainage apparatus capable of allowing the fluid flowing via diverse paths to flow via one path, the drainage apparatus comprising a first inlet pipe fluid flows in, a second inlet pipe fluid flows in, an outlet pipe in communication with the first inlet pipe and the second inlet pipe, a first outlet hole in contact with the first inlet pipe and the outlet pipe and a second outlet hole in contact with the second inlet pipe and the outlet pipe, wherein the first outlet hole and the second outlet hole are provided not to face each other directly.

10 Claims, 4 Drawing Sheets

(56) References Cited

FOREIGN PATENT DOCUMENTS

| | | |
|---|---|---|
| JP | 3-76940 A | 4/1991 |
| JP | 8-113968 A | 5/1996 |
| JP | 3567427 B2 | 9/2004 |
| JP | 4895892 B2 | 3/2012 |
| KR | 20-0447600 Y1 | 2/2010 |
| KR | 10-2014-0106007 A | 9/2014 |
| KR | 10-1455984 B1 | 11/2014 |
| WO | 2010147322 A2 | 12/2010 |
| WO | 2014/156067 A1 | 10/2014 |

OTHER PUBLICATIONS

Database WPI: "Drain system for dehumidifying dryer of washing machine—has drain hose for removing moisture connected to drain outlet or dryer", XP-002765856, Thompson Scientific, London, GB, Week 198611, AN 1986-071485 (JPS60-139290A—Matsushita Elec. Ind. Co., Ltd., Jul. 24, 1985).

* cited by examiner

【FIG 1】
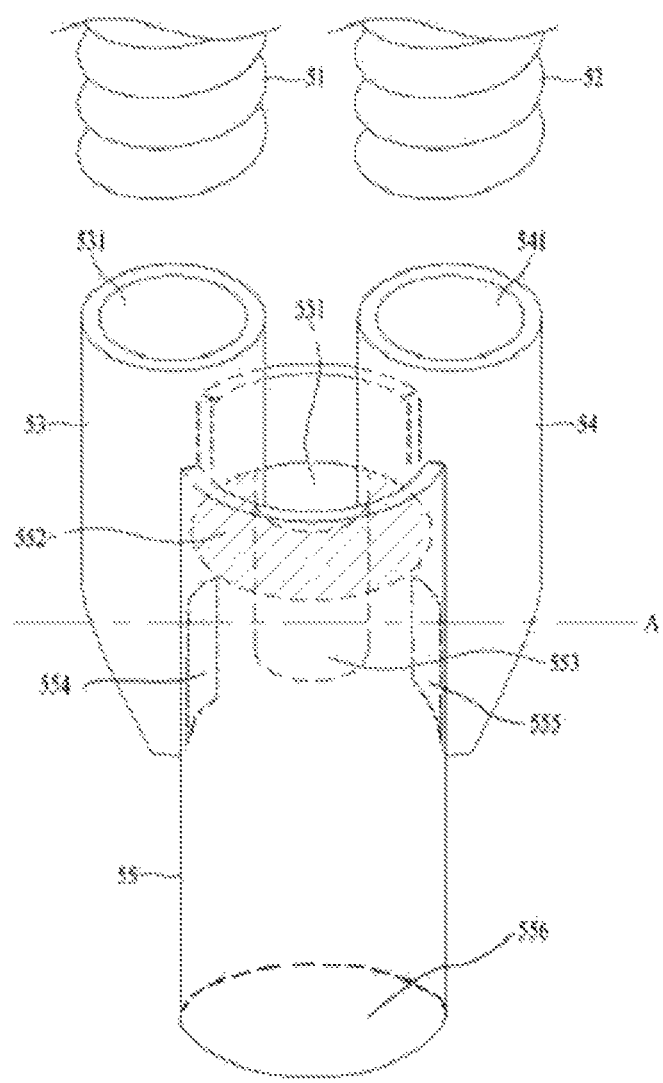
【FIG 2】
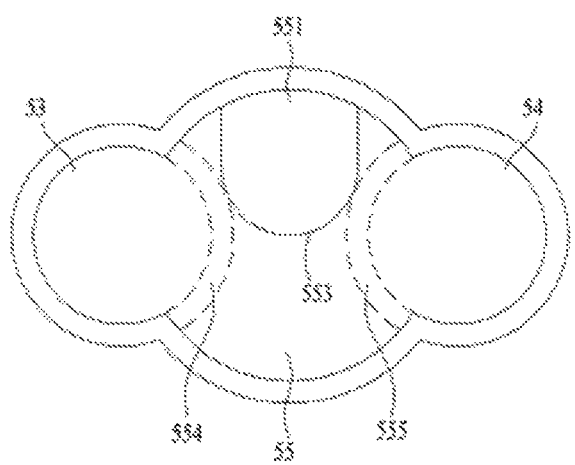

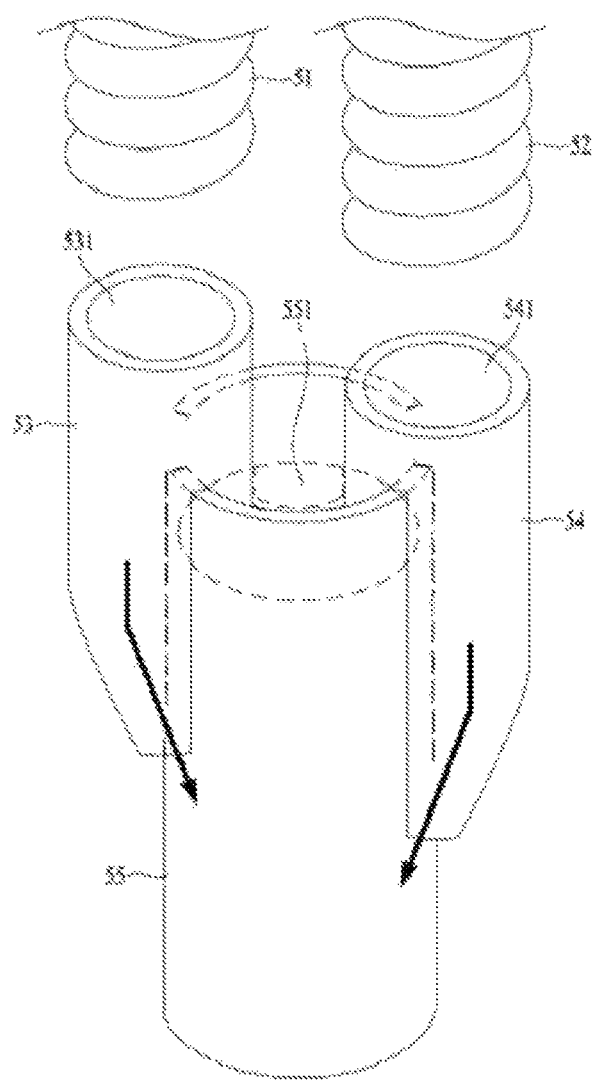
[FIG 3]

【FIG 4】
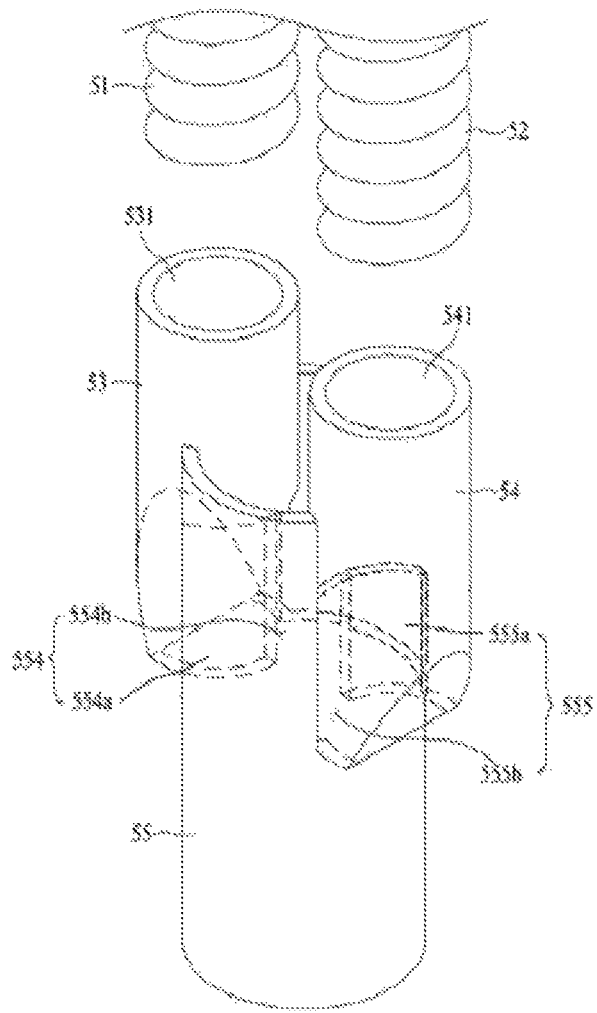
【FIG 5】
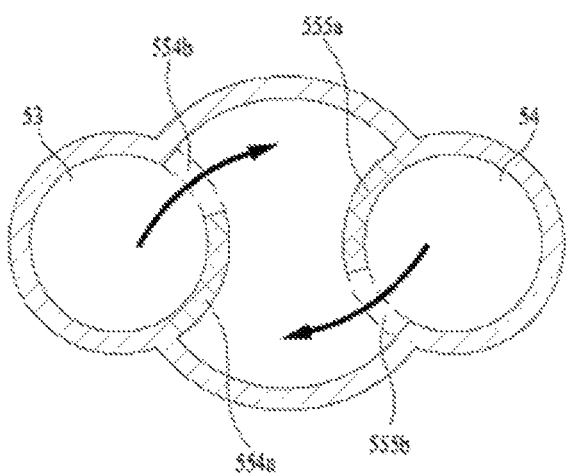

【FIG 6】
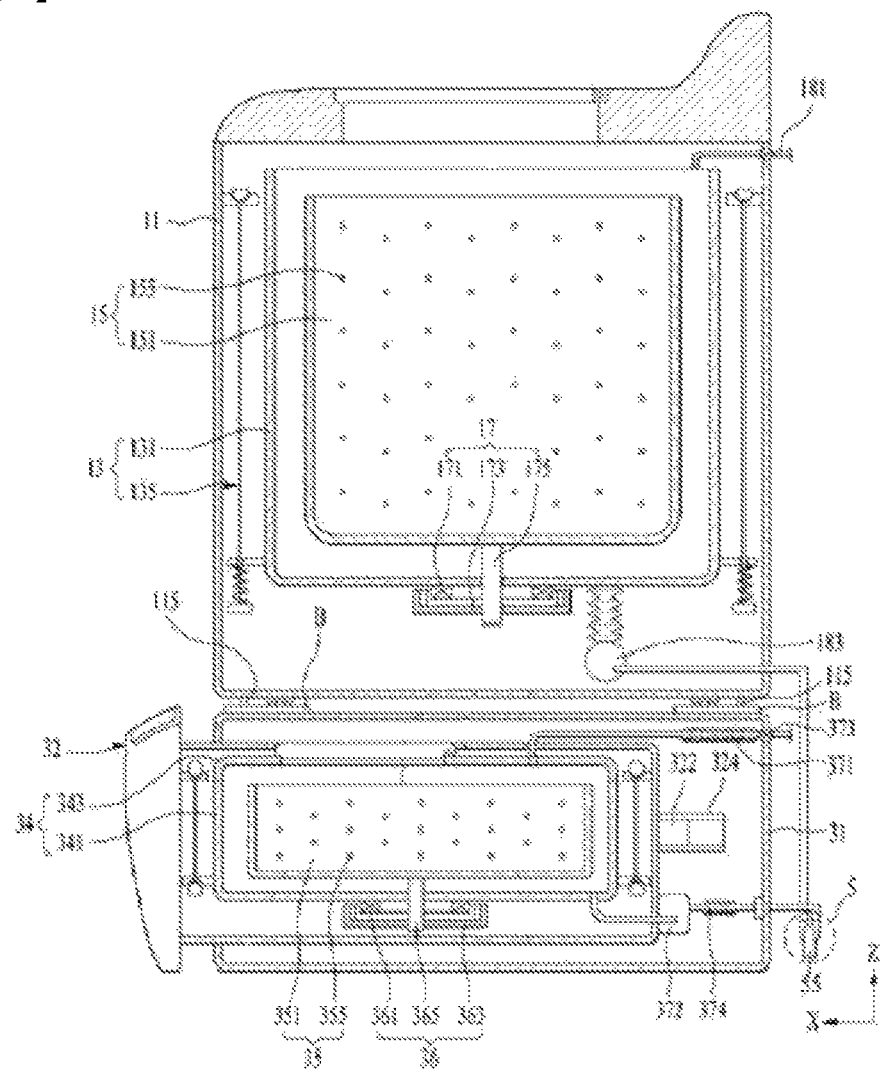

DRAINAGE APPARATUS

CROSS-REFERENCE TO RELATED APPLICATIONS

This application claims priority to Korean Patent Application No. 10-2015-0136776 filed on Sep. 25, 2015 in Korea, the entire contents of which is hereby incorporated by reference in its entirety.

BACKGROUND OF THE DISCLOSURE

Field of the Disclosure

Embodiments of the present disclosure relate to drainage apparatus for uniting diverse water flow paths.

Background of the Disclosure

A drainage apparatus means the mechanism for draining fluid such as used-water outside a specific device. Such a drainage apparatus is necessarily provided in a laundry treatment apparatus or a dishwasher. The laundry treatment apparatus released recently includes two or more laundry treating apparatuses which are united as one apparatus. One of the apparatuses serves as a washer and the other one serves as a dryer. The laundry treatment apparatus exemplified above is likely to have the wash water contaminated during the washing process and the water condensed during the drying process generated in two apparatuses, respectively.

However, the laundry treatment apparatus has two or more drainage paths when draining the contaminated wash water and the condensed water generated in the apparatuses outside and it is then to difficult to keep and maintain the drainage paths. If the two or more drainage paths for draining the contaminated wash water and the condensed water are united as one, the upkeep of the drainage paths can be more effectively performed. The water pressure becomes high and the wash water often happens to splash at the point where the contaminated water from other paths meets while the paths are united. If the wash water splashes, drainage flux fails to become smooth and efficient and it might leak through a third flow path.

SUMMARY OF THE DISCLOSURE

Accordingly, the present invention is provided to address the above-noted and other problems. An object of the present disclosure is to provide a drainage apparatus which is capable of preventing the fluid flowing from two paths from meeting and splashing to leak to a third inlet hole.

Embodiments of the present disclosure provide a drainage apparatus comprising a first inlet pipe fluid flows in; a second inlet pipe fluid flows in; an outlet pipe in communication with the first inlet pipe and the second inlet pipe; a third inlet hole provided in the outlet pipe and for inflow of fluid; a first outlet hole in contact with the first inlet pipe and the outlet pipe; a second outlet hole in contact with the second inlet pipe and the outlet pipe; and a partition wall arranged between the first outlet hole and the second outlet hole, wherein the third inlet hole is provided higher than the first outlet hole and the second outlet hole.

The partition wall may be connected with the third inlet hole and has a column shape. The partition wall may be extended from the third inlet hole to the first outlet hole and the second outlet hole along a central axis of the outlet pipe.

The partition wall may be extended from the third inlet hole to a point between the lowermost point and the midpoint of the first outlet hole and the second outlet hole.

The first inlet pipe, the second inlet pipe and the outlet pipe may be provided in parallel.

The first outlet hole and the second outlet hole may be connected with a lateral surface of outer surfaces of the outlet pipe.

The first outlet hole and the second outlet hole may be provided at different heights.

The first outlet hole and the second outlet hole may be provided at the same height.

Embodiments of the present disclosure also provide a drainage apparatus comprising a first inlet pipe fluid flows in; a second inlet pipe fluid flows in; an outlet pipe in communication with the first inlet pipe and the second inlet pipe; a third inlet hole provided in the outlet pipe and for inflow of fluid; a first outlet hole in contact with the first inlet pipe and the outlet pipe; and a second outlet hole in contact with the second inlet pipe and the outlet pipe, wherein the third inlet hole is provided higher than the first outlet hole and the second outlet hole, and the first outlet hole comprises a first cross section for blocking flow of wash water; and a first open surface which is open to allow the flow of wash water, and the second outlet hole comprises a second cross section for blocking flow of wash water; and a second open surface which is open to allow the flow of wash water.

The first outlet hole and the second outlet hole may be connected with a lateral surface of outer surfaces of the outlet pipe.

The first cross section and the second cross section may be provided in symmetry with respect to a central axis of the outlet pipe.

The first cross section may be provided in a clockwise direction of the first open surface, and the second cross section may be provided in a clockwise direction of the second open surface.

The first outlet hole and the second outlet hole are provided at different heights or the same height.

Embodiments of the present disclosure also provide a laundry treatment apparatus comprising a first laundry treatment apparatus comprising a first drainage pipe for draining wash water and configured to treat the drying and washing of clothes; a second laundry treatment apparatus comprising a second drainage pipe for draining wash water and configured to treat the drying and washing of clothes; a first inlet pipe in communication with the first drainage pipe; a second inlet pipe in communication with the second drainage pipe; an outlet pipe in communication with the first inlet pipe and the second inlet pipe; a third inlet hole provided in the outlet pipe and for inflow of condensed water; a first outlet hole in contact with the first inlet pipe and the outlet pipe; and a second outlet hole in contact with the second inlet pipe and the outlet pipe, wherein the third inlet hole is provided higher than the first outlet hole and the second outlet hole, and the first outlet hole and the second outlet hole are provided not to face each other directly.

The drainage apparatus in accordance with the embodiments of the present disclosure has an effect of preventing the fluid meeting after flowing from two paths from leaking to the third inlet hole.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1 is a perspective diagram illustrating a drainage apparatus in accordance with a first embodiment of the present disclosure;

FIG. 2 is a sectional diagram illustrating the drainage apparatus in accordance with the first embodiment;

FIG. 3 is a perspective diagram illustrating a drainage apparatus in accordance with a second embodiment of the present disclosure;

FIG. 4 is a perspective diagram illustrating a drainage apparatus in accordance with a third embodiment of the present disclosure;

FIG. 5 is a sectional diagram illustrating the drainage apparatus in accordance with the third embodiment; and FIG. 6 is a diagram illustrating the drainage apparatus connected to a first laundry treatment apparatus and a second laundry treatment apparatus.

DESCRIPTION OF SPECIFIC EMBODIMENTS

Description will now be given in detail according to exemplary embodiments disclosed herein, with reference to the accompanying drawings. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

As shown in FIG. 1, a drainage apparatus in accordance with a first embodiment may include a first inlet pipe 53 for sucking fluid; a second inlet pipe 54 for sucking fluid via another path; and an outlet pipe 55 in which the fluid inflowing to the first inlet pipe 53 meets the fluid inflowing to the second inlet pipe 54. The fluid sucked into the outlet pipe 55 is drained outside along the outlet pipe 55.

The first inlet pipe 53, the second inlet pipe 54 and the outlet pipe 55 are provided in a long cylindrical tube-like shape and the shapes of the pipes are not limited to the cylindrical tube shape but diversified in many shapes. The first inlet pipe 53, the second inlet pipe 54 and the outlet pipe 55 have two or more open sides to facilitate the inflow and outflow of fluid. Both ends of each pipe are usually open and a lateral surface of each pipe may be open.

Meanwhile, the fluid sucked into the first and second inlet pipes 53 and 54 may be wash water or condensed water in case of using a laundry treatment apparatus or a dishwasher. The first inlet pipe 53 is connected with a first drainage pipe 51 and configured to receive the fluid exhausted from the first drainage pipe 51. The second inlet pipe 54 is also connected with a second drainage pipe 52 and configured to receive the fluid exhausted from the second drainage pipe 52. The first inlet pipe 53 and the first drainage pipe 51 may be integrally formed with each other or detachable from each other. The second inlet pipe 54 and the second drainage pipe 52 may be also integrally formed with each other or detachable from each other.

The first inlet pipe 53 may include a first inlet hole 531 for sucking external fluid; and a first outlet hole 554 for exhausting the fluid sucked via the first inlet hole 531. The second inlet pipe 54 may also include a second inlet hole 541 for sucking external fluid; and a second outlet hole 555 for exhausting the fluid sucked via the second inlet hole 541.

The first inlet hole 531 may in communication with a first drainage pipe outlet hole 511 corresponding to an outlet of the first drainage pipe 51 and the second inlet hole 541 may be in communication with a second drainage pipe outlet hole 521 corresponding to an outlet of the second drainage pipe 52. The first inlet hole 531 and the first drainage pipe outlet hole 511 are in communication with each other and the fluid flowing there along are not leaked outside. They may be integrally formed with each other only if the fluid is not leaked there from. Alternatively, they may be sealed with each other if they are structured as independent components. In other words, unless the fluid leaks, the inlet hole 531 and the first drainage pipe 51 may be structured in various ways. Similar to the relation between the first inlet hole 531 and the first drainage pipe outlet hole 511, the second inlet hole 541 and the second drainage pipe outlet hole 521 are in communication and structured in various ways only unless the fluid leaks.

The first outlet hole 554 means the point where the first inlet pipe 53 is connected with the outlet pipe 55. Specifically, the first inlet pipe 53 and the outlet pipe 55 may share the first outlet hole 554. The fluid sucked into the first inlet pipe 53 may flow into the outlet pipe 55 via the first outlet hole 554. Likewise, the second outlet hole 555 may means the point where the second inlet pipe 54 is connected with the outlet pipe 55 and the second inlet pipe 54 and the outlet pipe 55 may share the second outlet hole 555. The fluid sucked into the second inlet pipe 54 may flow into the outlet pipe 55 via the second outlet hole 555.

The first outlet hole 554 may be provided in one end or a lateral surface of the first inlet pipe 53. The second outlet hole 555 may be provided one end or a lateral surface of the second inlet pipe 54. The first outlet hole 554 may be provided in one end or a lateral surface of the outlet pipe 55 and the second outlet hole 555 may be provided in one end or a lateral surface of the outlet pipe 55.

In other words, the first inlet pipe 53 and the outlet pipe 55 may be connected with each other freely. The end or lateral surface of the first inlet pipe 53 may be connected with the end or lateral surface of the outlet pipe 55. The angle at which they are connected may be variable diversely. Like the firs inlet pipe 54, the second inlet pipe 54 may be connected with the outlet pipe 55 freely.

In the first embodiment shown in FIG. 1, the first outlet hole 554 and the second outlet hole 555 are provided in a lateral surface of the outlet pipe 55 and the first outlet hole 554 is provided in a lateral surface of the first inlet pipe 53. The second outlet hole 555 is provided in a lateral surface of the second inlet pipe 54. The first inlet pipe 53, the second inlet pipe 54 and the outlet pipe 55 may be provided in parallel. The first inlet pipe 53 and the second inlet pipe 54 connected to the lateral surface of the outlet pipe 55 may form various angles.

When the first inlet pipe 53 and the second inlet pipe 54 are connected to the lateral surface of the outlet pipe 55, both ends of the outlet pipe 55 become open. One end of the outlet pipe 55 may be configured as the outlet hole 556 for exhausting the fluid sucked into the first inlet pipe 53 and the second inlet pipe 54. The other end of the outlet pipe 55 may be kept open or closed or configured as a path hole for sucking other fluid.

In the first embodiment shown in FIG. 1, the other end of the outlet pipe 55 (the opposite side of the outlet hole 556) may further include a third inlet hole 551 for sucking fluid along another path.

The wash water generated by the result of the washing process or the condensed water generated during the dry air generation process in the laundry treatment apparatus or dishwasher may be sucked into the third inlet hole 551. The fluid sucked into the first inlet pipe 53 or the second inlet pipe 54 may be a large amount of wash water which is generated by the result of the washing process and the fluid sucked into the third inlet 551 may be a small amount of fluid such as condensed water. However, it is obvious in the embodiments of the present disclosure that the kinds of the fluid sucked into the first inlet pipe 53, the second inlet pipe 54 and the third inlet hole 551 are not limited to what is described.

A diameter of the third inlet hole 551 provided in the outlet pipe 55 may be smaller than a diameter of the outlet pipe 55. The other end portion of the outlet pipe 55 except the third inlet hole 551 may be provided as an upper surface 552. In other words, the third inlet hole 551 may be partially penetrating the upper surface 552 provided in the other end of the outlet pipe 55. In this instance, the third inlet hole 551 may be provided in an edge area or a central area of the other end of the outlet pipe 55.

Referring to FIG. 1, the first outlet hole 554 and the second outlet hole 555 may be provided in the lateral surface of the outlet pipe 55, with the same height. The fluid sucked into the first inlet pipe 53 and the second inlet pipe 54 could have a high water pressure and the wash water flowing via the first outlet hole 554 and the second outlet hole 555 meets each other in the outlet pipe 55. In this instance, it is concerned that resistance occurs in the flux of fluid flowing outside from the outlet pipe or the fluid leaks to the third inlet hole 551. Such a concerning disadvantage arises when fluid flowing from the first outlet hole 554 and the second outlet hole 555 provided in the lateral surface of the outlet pipe 55 at the same height meet face to face in the outlet pipe.

To prevent the disadvantage, the drainage apparatus in accordance with the embodiment shown in FIG. 1 may further include a partition wall 553 provided in the outlet pipe 53 to prevent the fluid flowing from the first outlet hole 554 from meeting the fluid flowing from the second outlet hole 555.

The partition wall 553 may change the flow of fluid toward the outlet hole 554 of the outlet pipe 55 and prevent the fluid flowing from the first outlet hole 554 and the fluid flowing from the second outlet hole 555 from becoming overlapped with each other which leads to the leakage of fluid to the third inlet hole 551.

For those functions, the partition wall 553 may be provided in a pipe shape and in communication with the third inlet hole 551. The partition wall 553 may start from the third inlet hole 551 longitudinally farther than a midpoint between the first outlet hole 554 and the second outlet hole 555. The longer is the partition wall 553, the smaller is the probability that the fluid leaks via the third inlet hole 551. However, there is concern that the partition wall 553 longer than the lowermost points of the first outlet hole 554 and the second outlet hole 555 might interfere in the flux of the fluid flowing from the first outlet hole 554 and the second outlet hole 555. It is preferred that the partition is long enough to be between the midpoints and the lowermost points of the first and second outlet holes 554 and 555.

FIG. 2 is a sectional diagram of the drainage apparatus, past a dotted line of 'A' shown in FIG. 1 it is shown that the first inlet pipe 53 and the second inlet pipe 54 are connected with the outlet pipe 55. The connected points (shown as a dotted line) between the outlet pipe 55 and the first and second inlet pipes 53 and 54 may be provided as the first outlet hole 554 and the second outlet hole 555, respectively.

The partition wall 553 connected with the third inlet hole 551 may prevent the fluid flowing from the first outlet hole 554 from directly meeting the fluid flowing from the second outlet hole 555 and also prevent the fluid from leaking to the third inlet hole 551.

FIG. 3 illustrates another embodiment of the present disclosure. The biggest difference between this embodiment and the embodiment shown in FIG. 1 is that the height of the first outlet hole 554 is different from that of the second outlet hole 555. The first outlet hole 554 and the second outlet hole 555 are provided in the lateral surface of the outlet pipe 55 at different heights, so that they may not face each other. The fluid flowing to the first outlet hole 554 will not directly meet the fluid flowing to the second outlet hole 555 only to facilitate the flux of fluid and reduce the probability that the fluid might leak to the third inlet hole 551.

Even when the first outlet hole 554 and the second outlet hole 555 are provided at different heights, the partition wall 553 may be provided. The length of the partition wall 553 may be adjusted to the one of the first and second outlet holes 554 and 555 which is higher than the other in the outlet pipe 55. In other words, the height of the partition wall 553 may be adjusted to become equal to the height from the lowermost point to the midpoint of the one of the outlet holes provided in the outlet pipe 55. The illustrated embodiment may include not partition wall 553.

Meanwhile, FIGS. 4 and 5 illustrate a further embodiment of the present disclosure. Similar to FIG. 2 which is the sectional diagram of FIG. 1, FIG. 5 is a sectional diagram of FIG. 4. The biggest difference between the embodiment shown in FIG. 1 and the embodiment shown in FIG. 4 is the structure of the first and second outlet holes 554 and 555. Specifically, a certain portion of the first outlet hole 554 is open and the other portion is closed. A certain portion of the second outlet hole 555 is open and the other portion is closed. The first outlet hole 554 may include a first cross section 554a for partially closing the first outlet hole and a first open surface 554b as the open portion. Likewise, the second outlet hole 555 may include a second cross section 555a for partially closing the second outlet hole and a second open surface 555b as the open portion.

The first cross section 554a and the second cross section 555a may function to prevent the first outlet hole 554 from directly facing the second outlet hole 555. Accordingly, the fluid flowing from the first inlet pipe 53 will not directly face the fluid flowing from the second inlet pipe 54 in the outlet pipe 55.

The first cross section 554a and the second cross section 555a may be provided in symmetry with respect to a central axis of the outlet pipe 55.

The first cross section 554a may be provided in any locations within the first outlet hole 554 but it is preferred that the first cross section 554a is provided in a clockwise direction of the first open surface 554b. Likewise, the second cross section 555a may be also provided in any locations within the second outlet hole 555 and it is preferred that the second cross section 555a is provided in a clockwise direction of the second open surface 555b.

FIG. 5 illustrates a state where the first cross section 554a and the second cross section are arranged in the locations as mentioned above. The fluid flowing into the first inlet pipe 53 may be exhausted to the outlet pipe 55 via the first open surface 554b and the fluid flowing into the second inlet pipe 54 via the second open surface 555b. In this instance, the arrangement of the first cross section 554a and the second cross section 555a may form flow of paths as shown in an arrow.

The flux along the direction of the arrow shown in FIG. 5 may form a clockwise vortex shaped path in the outlet pipe 55. The object performing movement in the northern hemisphere of the earth will be subjected to a right direction force and that is the phenomenon generated by the rotation of the earth, which is called Coriolis Phenomenon. In other words, Coriolis force acts in a right direction with respect to the flux of the fluid. The water drained through a drainage pipe in the northern hemisphere forms a clockwise vortex.

To form the flow along the path shown in FIG. 5, the first cross section 554a and the second cross section 555a are provided in a clockwise direction of the first open surface 554b and the second open surface 555b, respectively, with respect to the centers of the first inlet pipe 53 and the second inlet pipe 54.

In case of the southern hemisphere, the first cross section 554a and the second cross section 55a are located in a counter-clockwise direction of the first open surface 554b and the second open surface 555b, respectively.

Accordingly, the fluid flowing from the first inlet hole 531 will not meet the fluid flowing from the second inlet fluid 541 but become drained smoothly while forming a vortex, so that it can be less likely that water splashes to the third inlet hole 551.

Even in the embodiment shown in FIGS. 4 and 5, the first outlet hole 554 and the second outlet hole 555 are provided in the lateral surface of the outlet pipe 55 at the same heights. However, it is possible to provide the first outlet holes 554 and the second outlet holes 555 at different heights and the probability is small that water splashes because the first outlet hole 554 does not face the second outlet hole 555 even without the partition wall 553. Of course, the partition wall 553 may be further provided.

The drainage apparatus 5 in accordance with the embodiments of the present disclosure may be connected to two or more laundry treatment apparatuses (for example, washers, dryers, washing dryers and dishwashers). FIG. 6 is a diagram illustrating the drainage apparatus 5 provided in the laundry treatment apparatus including a washing dryer and a washer.

Referring to FIG. 6, the laundry treatment apparatus including two or more united apparatuses in accordance with one embodiment of the present disclosure will be described in brief. A first laundry treatment apparatus 1 may include a first cabinet 11; a first tub 13 provided in the first cabinet 11; a first drum 15 rotatably oriented in the first tub 13; a first driving unit 17 rotating the first drum 15; a first water supply unit 181 supplying wash water to the first tub 13; and a first water drainage unit 183 draining the wash water. In addition, a hot air supply device (not shown) may be provided for a drying function.

The first laundry treatment apparatus 1 may be a top loading type washer or a drum type washer. The hot air supply device may have a circulation or exhaustion structure. The types of the washer and the structures of the hot air supply device are well-known in the air to which the present disclosure pertains and the detailed description thereof will be omitted.

The first tub 13 may include a first tub body 131 and a first tub supporter 135. The first driving unit 17 may include a stator 171, a rotor 173 and a first drum shaft 175.

The second laundry treatment apparatus 3 may include a second cabinet 31; a drawer 32 retractably provided in the second cabinet; a second tub 34 provided in the drawer 32; a second drum rotatably oriented in the second tub 34; a second driving unit 36 rotating the second drum; a second water supply unit supplying wash water to the second tub 34; and a second water drainage unit draining the wash water.

The drawer 32 may slide along a rail 322 provided in a rail supporter 324 when moving from the second cabinet 31. The second tub 34 may include a second tub body 341 and a tub cover 343. The second drum 35 may include a second drum bod 351 and a penetrating hole 355 through which wash water inflows and outflows. The second driving unit 36 may include a stator 361; a rotor 363; and a second drum shaft 373. The second water supply unit may include a water supply pipe 371 formed in a corrugated shape; and a water supply valve 373. The second water drainage unit may include a drainage pump 372; and a corrugated pipe 374.

The wash water drained from the first water drainage unit 183 may inflow to the first inlet pipe 53 via the first drainage pipe 51. The wash water drained from the second water drainage unit may inflow to the second inlet pipe 54 via the second drainage pipe 52. The condensed water generated by the result of the drying process in the first laundry treatment apparatus 1 or the second laundry treatment apparatus 3 may be drained via the third inlet hole 551 of the drainage apparatus 5.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A drainage apparatus comprising:
    a first inlet pipe through which fluid flows;
    a second inlet pipe through which fluid flows;
    an outlet pipe in communication with the first inlet pipe and the second inlet pipe;
    a first outlet hole providing passage provided at portion where the first inlet pipe and the outlet pipe are connected; and
    a second outlet hole providing passage provided at the portion where the second inlet pipe and the outlet pipe are connected,
    wherein the first outlet hole comprises a first cross section for blocking wash water flow and a first open surface which is open to allow wash water flow,
    wherein the second outlet hole comprises a second cross section for blocking wash water flow and a second open surface which is open to allow wash water flow, and
    wherein the first cross section and the second cross section are provided to be extended from the first outlet hole and the second outlet hole respectively to prevent the first open surface and the second open surface from facing each other.

2. The drainage apparatus of claim 1, wherein the first outlet hole and the second outlet hole are connected with a lateral surface of the outlet pipe.

3. The drainage apparatus of claim 2, wherein the first cross section and the second cross section are provided in symmetry with respect to a central axis of the outlet pipe.

4. The drainage apparatus of claim 2, wherein the first cross section is provided in a clockwise direction of the first open surface, and
wherein the second cross section is provided in a clockwise direction of the second open surface.

5. The drainage apparatus of claim 1, wherein the first outlet hole and the second outlet hole are provided at different heights.

6. The drainage apparatus of claim 1, wherein the first outlet hole and the second outlet hole are provided at the same height.

7. A laundry treatment system comprising:
a first laundry treatment apparatus for the washing and drying of clothes having a first drainage pipe for draining wash water;
a second laundry treatment apparatus for the washing and drying of clothes having a second drainage pipe for draining wash water;
a first inlet pipe in communication with the first drainage pipe;
a second inlet pipe in communication with the second drainage pipe;
an outlet pipe in communication with the first inlet pipe and the second inlet pipe;
a first outlet hole providing passage provided at portion where the first inlet pipe and the outlet pipe are connected;
a second outlet hole providing passage provided at portion where the first inlet pipe and the outlet pipe are connected; and
a third inlet hole provided in the outlet pipe for the inflow of condensed water,
wherein the first laundry treatment apparatus further comprises:
a first cabinet;
a first tub provided in the first cabinet for receiving water;
a first drum provided in the first tub and configured to receive laundry; and
a first motor provided on the first tub and configured to rotate the first drum;
wherein the second laundry treatment apparatus further comprises:
a second cabinet provided adjacent to the first cabinet;
a second tub provided in the second cabinet for receiving water; and
a second drum provided in the second tub and configured to receive laundry;
a second motor provided on the second tub and configured to rotate the second drum,
wherein the third inlet hole is provided higher than the first outlet hole and the second outlet hole,
wherein the first outlet hole comprises a first cross section for blocking wash water flow and a first open surface which is open to allow wash water flow,
wherein the second outlet hole comprises a second cross section for blocking wash water flow and a second open surface which is open to allow wash water flow, and
wherein the first cross section and the second cross section are provided to be extended from the first outlet hole and the second outlet hole respectively to prevent the first open surface and the second open surface from facing each other.

8. The laundry treatment system of claim 7, wherein the first inlet pipe, the second inlet pipe, and the outlet pipe are provided in parallel.

9. The laundry treatment system of claim 7, wherein the first outlet hole and the second outlet hole are provided at different heights.

10. The laundry treatment system of claim 7, wherein the first outlet hole and the second outlet hole are provided at the same height.

\* \* \* \* \*